United States Patent
Goldstein et al.

(10) Patent No.: US 9,367,196 B1
(45) Date of Patent: Jun. 14, 2016

(54) CONVEYING BRANCHED CONTENT

(71) Applicant: AUDIBLE, INC., Newark, NJ (US)

(72) Inventors: Douglas S. Goldstein, Riverdale, NY (US); Ajay Arora, New York, NY (US); Douglas C. Hwang, New York, NY (US); Guy A. Story, Jr., New York, NY (US); Shirley C. Yang, New York, NY (US)

(73) Assignee: AUDIBLE, INC., Newark, NJ (US)

( * ) Notice: Subject to any disclaimer, the term of this patent is extended or adjusted under 35 U.S.C. 154(b) by 182 days.

(21) Appl. No.: 13/627,243

(22) Filed: Sep. 26, 2012

(51) Int. Cl.
*G06F 3/048* (2013.01)

(52) U.S. Cl.
CPC ...................................... *G06F 3/048* (2013.01)

(58) Field of Classification Search
CPC .......... H04N 5/44543; H04N 21/4622; H04N 21/47; G11B 27/34; G11B 27/034; G06F 3/048
See application file for complete search history.

(56) References Cited

U.S. PATENT DOCUMENTS

| | | | |
|---|---|---|---|
| 5,203,705 A | 4/1993 | Hardy et al. | |
| 5,351,189 A | 9/1994 | Doi et al. | |
| 5,657,426 A | 8/1997 | Waters et al. | |
| 5,737,489 A | 4/1998 | Chou et al. | |
| 5,978,754 A | 11/1999 | Kumano | |
| 6,076,059 A | 6/2000 | Glickman et al. | |
| 6,208,956 B1 | 3/2001 | Motoyama | |
| 6,256,610 B1 | 7/2001 | Baum | |
| 6,260,011 B1 | 7/2001 | Heckerman et al. | |
| 6,356,922 B1 | 3/2002 | Schilit et al. | |
| 6,544,040 B1 * | 4/2003 | Brelis et al. | 434/236 |
| 6,638,171 B1 * | 10/2003 | Igarashi et al. | 463/43 |
| 6,766,294 B2 | 7/2004 | MacGinite et al. | |
| 6,912,505 B2 | 6/2005 | Linden et al. | |
| 7,107,533 B2 | 9/2006 | Duncan et al. | |
| 7,231,351 B1 | 6/2007 | Griggs | |
| 7,849,043 B2 * | 12/2010 | Woolf et al. | 706/48 |
| 8,106,285 B2 | 1/2012 | Gerl et al. | |
| 8,109,765 B2 | 2/2012 | Beattie et al. | |
| 8,131,545 B1 | 3/2012 | Moreno et al. | |
| 8,131,865 B2 | 3/2012 | Rebaud et al. | |

(Continued)

FOREIGN PATENT DOCUMENTS

| CN | 103988193 A | 8/2014 |
|---|---|---|
| CN | 104662604 A | 5/2015 |

(Continued)

OTHER PUBLICATIONS

Fabio Vignoli et al., Aug. 7-10, 1999, A Text-Speech Synchronization Technique With Applications to Talking Heads, Auditory-Visual Speech Processing, ISCA Archive.

(Continued)

*Primary Examiner* — Jennifer To
*Assistant Examiner* — Xuyang Xia
(74) *Attorney, Agent, or Firm* — Knobbe, Martens, Olson and Bear, LLP

(57) ABSTRACT

Items of content may be organized into branched portions. From a current portion of an item of content, a branch may be selected, and the portion of the item of content connected by the selected branch to the current portion of the item of content may be conveyed. In this respect, multiple paths through the item of content may be achieved, each path including one or more portions connected to each other by one or more branches.

21 Claims, 9 Drawing Sheets

(56) References Cited

U.S. PATENT DOCUMENTS

| | | | |
|---|---|---|---|
| 8,317,606 B2* | 11/2012 | Graham et al. | 463/29 |
| 8,442,423 B1 | 5/2013 | Ryan et al. | |
| 8,512,042 B2* | 8/2013 | Rogan et al. | 434/107 |
| 8,527,272 B2 | 9/2013 | Qin et al. | |
| 8,548,618 B1 | 10/2013 | Story, Jr. et al. | |
| 8,577,668 B2 | 11/2013 | Rosart et al. | |
| 8,849,676 B2 | 9/2014 | Goldstein et al. | |
| 8,855,797 B2 | 10/2014 | Story, Jr. et al. | |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 9,099,089 B2 | 8/2015 | Dzik et al. | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0116188 A1 | 8/2002 | Amir et al. | |
| 2002/0184189 A1 | 12/2002 | Hay et al. | |
| 2003/0061028 A1 | 3/2003 | Dey et al. | |
| 2003/0083885 A1 | 5/2003 | Frimpong-Ansah | |
| 2003/0115289 A1 | 6/2003 | Chinn et al. | |
| 2004/0168121 A1* | 8/2004 | Matz | 715/513 |
| 2004/0261093 A1 | 12/2004 | Rebaud et al. | |
| 2005/0022113 A1 | 1/2005 | Hanlon | |
| 2006/0064733 A1* | 3/2006 | Norton et al. | 725/135 |
| 2006/0148569 A1 | 7/2006 | Beck | |
| 2007/0016314 A1 | 1/2007 | Chan et al. | |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2007/0282844 A1 | 12/2007 | Kim et al. | |
| 2008/0005656 A1 | 1/2008 | Pang et al. | |
| 2008/0027726 A1 | 1/2008 | Hansen et al. | |
| 2008/0177822 A1 | 7/2008 | Yoneda | |
| 2008/0294453 A1 | 11/2008 | Baird-Smith et al. | |
| 2008/0294782 A1* | 11/2008 | Patterson | 709/227 |
| 2009/0047003 A1 | 2/2009 | Yamamoto | |
| 2009/0136213 A1 | 5/2009 | Calisa et al. | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 | 11/2009 | Hager | |
| 2009/0281645 A1 | 11/2009 | Kitahara et al. | |
| 2009/0298019 A1* | 12/2009 | Rogan et al. | 434/107 |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0203970 A1* | 8/2010 | Hope | 463/42 |
| 2010/0218094 A1* | 8/2010 | Ofek et al. | 715/706 |
| 2010/0225809 A1 | 9/2010 | Connors et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0153330 A1 | 6/2011 | Yazdani et al. | |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1 | 9/2011 | Locker et al. | |
| 2011/0246175 A1 | 10/2011 | Yi et al. | |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2011/0320189 A1 | 12/2011 | Carus et al. | |
| 2012/0030288 A1 | 2/2012 | Burckart et al. | |
| 2012/0109640 A1 | 5/2012 | Anisimovich et al. | |
| 2012/0124505 A1* | 5/2012 | St. Jacques, Jr. | G06F 3/0483 715/776 |
| 2012/0150935 A1 | 6/2012 | Frick et al. | |
| 2012/0158706 A1 | 6/2012 | Story, Jr. et al. | |
| 2012/0166180 A1 | 6/2012 | Au | |
| 2012/0197998 A1 | 8/2012 | Kessel et al. | |
| 2012/0245720 A1 | 9/2012 | Story, Jr. et al. | |
| 2012/0246343 A1 | 9/2012 | Story, Jr. et al. | |
| 2012/0310642 A1 | 12/2012 | Cao et al. | |
| 2012/0315009 A1 | 12/2012 | Evans et al. | |
| 2012/0324324 A1 | 12/2012 | Hwang et al. | |
| 2013/0036140 A1* | 2/2013 | Bowes | 707/781 |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0074133 A1 | 3/2013 | Hwang et al. | |
| 2013/0130216 A1 | 5/2013 | Morton et al. | |
| 2013/0212454 A1 | 8/2013 | Casey | |
| 2013/0257871 A1 | 10/2013 | Goldstein et al. | |
| 2014/0005814 A1 | 1/2014 | Hwang et al. | |
| 2014/0039887 A1 | 1/2014 | Dzik et al. | |
| 2014/0040713 A1 | 2/2014 | Dzik et al. | |
| 2014/0100040 A1* | 4/2014 | Chung et al. | 463/42 |
| 2014/0149867 A1* | 5/2014 | McCaddon et al. | 715/723 |
| 2014/0223272 A1 | 8/2014 | Arora et al. | |
| 2014/0250219 A1 | 9/2014 | Hwang | |
| 2015/0026577 A1 | 1/2015 | Story et al. | |
| 2015/0340038 A1 | 11/2015 | Dzik et al. | |

FOREIGN PATENT DOCUMENTS

| | | |
|---|---|---|
| EP | 2689346 | 1/2014 |
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 A | 7/2005 |
| JP | 2007-522591 | 8/2007 |
| JP | 2007-249703 | 9/2007 |
| JP | 2010-250023 | 11/2010 |
| NZ | 532174 | 11/2012 |
| WO | WO 2006/029458 | 3/2006 |
| WO | WO 2011/144617 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Yardena Arar, Jan. 7, 2010, Blio E-Book Platform: No Reader (Yet), But Great Graphics.

International Search Report re International Application No. PCT/US13/33935 mailed on Jul. 3, 2013.

International Search Report issued for PCT/US12/30198 mailed on Jun. 20, 2012, 16 pages.

U.S. Appl. No. 13/531,376, filed Jun. 22, 2012, entitled "Modelling Expected Errors for Discriminative Training."

U.S. Appl. No. 13/536,711, filed Jun. 28, 2012, entitled "Pacing Content."

U.S. Appl. No. 13/662,306, filed Oct. 26, 2012, entitled "Content Presentation Analysis."

Beattie, Valerie et al., "Reading Assistant: Technology for Guided Oral Reading", Scientific Learning, Apr. 10, 2012, 5 pages.

Levinson, S.E. et al., "Continuous Speech Recognition from a Phonetic Transcription", Acoustics, Speech, and Signal Processing, Apr. 1990, pp. 190-199.

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

(56) References Cited

OTHER PUBLICATIONS

Story Jr. et al., U.S. Appl. No. 12/881,021, filed Sep. 13, 2010, entitled "Systems and Methods for Associating Stories with Related Referents".
Extended Search Report in European Application No. 12761104.4 dated Apr. 20, 2015.
Office Action in Canadian Application No. 2830906 dated Mar. 17, 2015.
Office Action in Japanese Application No. 2014-501257 dated Apr. 6, 2015.
Dzik, S.C., U.S. Appl. No. 13/604,482, filed Sep. 5, 2012, entitled Identifying Corresponding Regions of Content.
Dzik, S.C., U.S. Appl. No. 13/604,486, filed Sep. 5, 2012, entitled Selecting Content Portions for Alignment.
International Search Report issued in connection with International Patent Application No. PCTUS12/30186 mailed on Jun. 20, 2012, 12 pages.
Extended Search Report in European Application No. (12761404.8) dated Jan. 26, 2015.
Office Action in Japanese Application No. 2014-501254 dated Oct. 14, 2014.
International Preliminary Report on Patentability issued in connection with International Patent Application No. PCT/US12/30198 mailed on Jan. 30, 2014, 8 pages.
Office Action in Japanese Application No. 2014-501257 dated Aug. 25, 2014.
International Search Report and Written Opinion in PCT/US2013/042903 mailed Feb. 7, 2014.
International Preliminary Report on Patentability in PCT/US2013/042903 mailed Dec. 2, 2014.
International Search Report issued in connection with International Application No. PCT/US13/53020 mailed on Dec. 16, 2013.
International Preliminary Report issued in connection with International Application No. PCT/US13/53020 mailed on Feb. 12, 2015.
International Search Report and Written Opinion in PCT/US2014/014508 mailed Jun. 25, 2014.
Office Action in Japanese Application No. 2014-501254 dated May 11, 2015.
Office Action in Canadian Application No. 2830622 dated Jun. 10, 2015.
International Preliminary Search Report on Patentability in PCT/US2014/014508 mailed Aug. 4, 2015.

\* cited by examiner

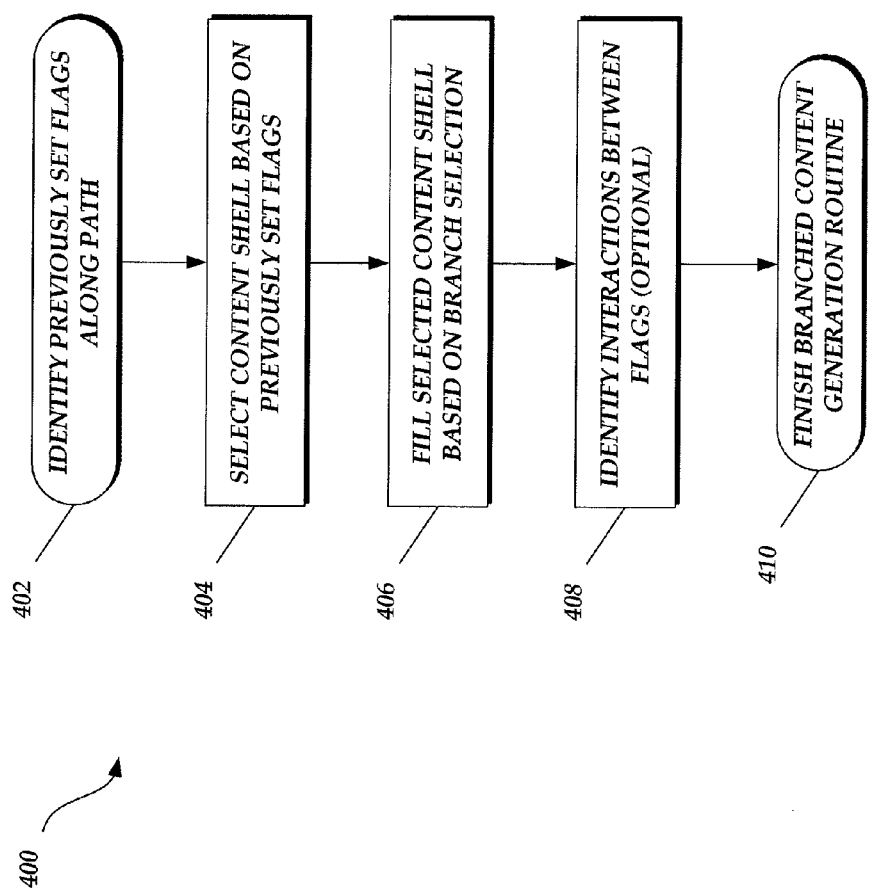

CONVEYING BRANCHED CONTENT

BACKGROUND

Generally described, computing devices may convey items of digital content to users. For example, computing devices may visually convey items of content such as animations, electronic books, electronic periodicals, movies, television programs, multi-media content, and portions thereof on an electronic screen or touchscreen. Computing devices may also direct audible output through headphones or speakers to convey items of audible content such as audiobooks, songs, movies, television programs, multi-media content, and portions thereof.

Typically, these items of content are conveyed in linear fashion. For example, an audiobook may start at the beginning and be conveyed straight through until it ends or until a user stops using the user computing device. While listening to an audiobook in this passive manner is often sufficient for some users, other users may lose interest from the lack of interactivity of the audiobook.

Some users may be interested in "jumping around" in the audiobook to increase the audiobook's interactivity. However, audiobooks typically are generated to be conveyed in a linear fashion, as discussed above. Users that "jump around" in the audiobook may not appreciate the audiobook, as the portions to which they jump may not lend themselves to being conveyed out of an original order. For example, an audiobook may include three chronologically-organized chapters, with the first chapter occurring before the second chapter, and the second chapter occurring before the third chapter. A user that jumps to the second chapter of the audiobook before proceeding to the first chapter of the audiobook may have an incoherent and confusing experience with the audiobook. These problems and others are also present when other types of items of content are conveyed.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 4 is a flow diagram depicting an illustrative routine for generating branched content.

DETAILED DESCRIPTION

Figure 1:
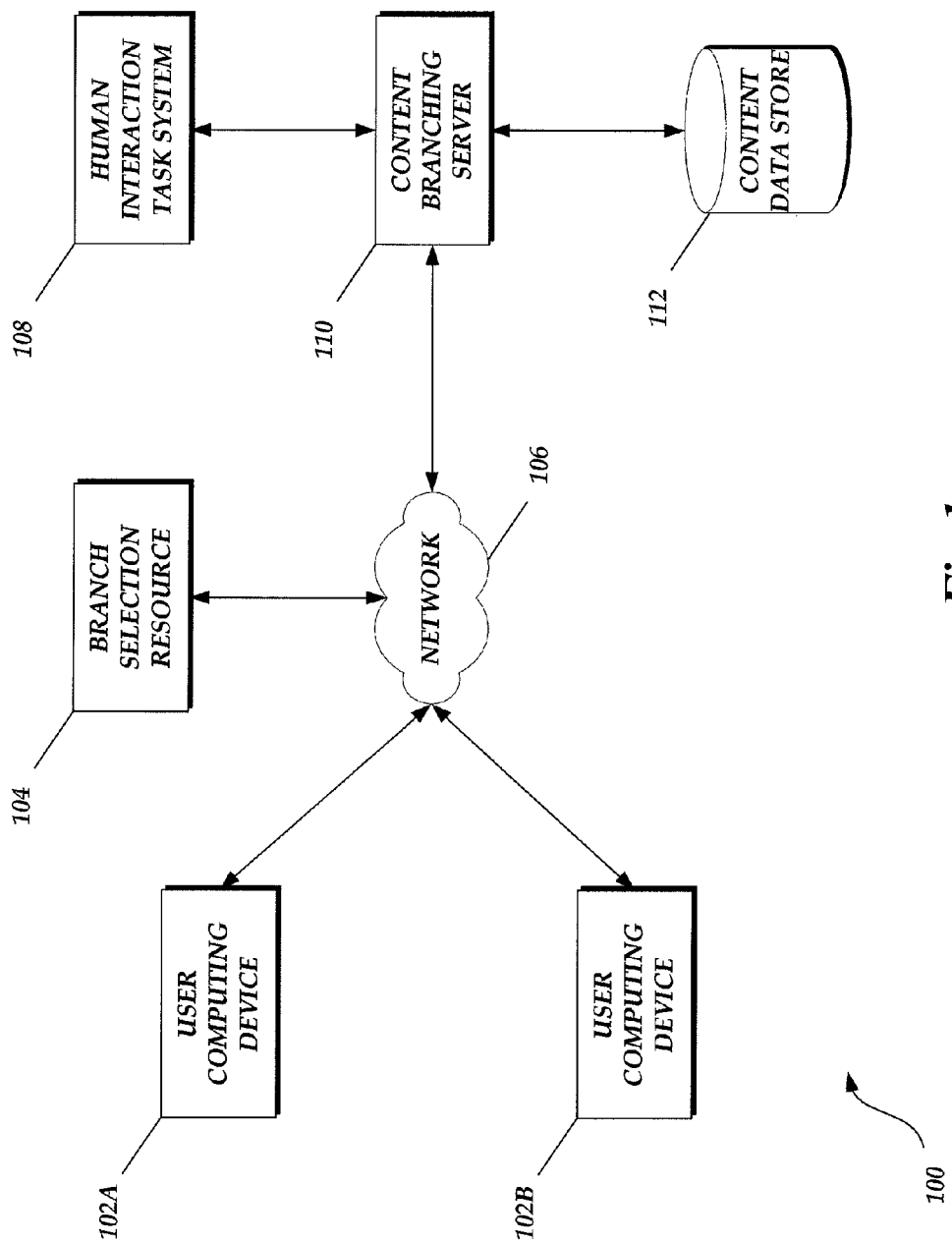
FIG. 1 is a schematic diagram of an illustrative network environment in which a content branching service may operate.

Generally described, aspects of the present disclosure are directed to conveying portions of items of content that may be connected by branches present in the item of content. These branches may constitute one or more paths through the different portions of the item of content, which paths may be followed by the user to consume the item of content. Accordingly, a content branching service is disclosed. In one embodiment, a user computing device conveys a portion of an item of content. Once the current portion of the item of content is conveyed, a selection of a branch connecting the portion of the item of content to another portion of the item of content may be received by the user computing device. The user computing device may then convey the portion of the item of content to which the current portion is connected by the selected branch.

Branches and branched portions may be identified in the item of content in a number of ways. In one embodiment, the branches are specified by an author or publisher of the item of content. For example, the author or publisher may embed markup language in the item of content to indicate which portions are connected to which other portions. Additionally, branches connecting portions in the item of content may be generated automatically by the content branching service. For example, common characters, locations, or plot events may be used to identify portions of the item of content that could be connected by branches. Those skilled in the art will recognize that other techniques for identifying or generating branches for an item of content may be utilized without departing from the scope of the present disclosure.

In some embodiments, these branches are one-directional, such that only certain paths are available through the item content. Put another way, the item of content may be thought of as a directed graph, with portions of the item of content corresponding to nodes of the graph and branches corresponding to edges of the graph. An example will help illustrate this concept. An audiobook item of content may contain three portions connected by branches: Portion A, Portion B, and Portion C. One branch may connect Portion A with Portion B. Another branch may connect Portion A with Portion C. Yet another branch may connect Portion C with Portion B. The audiobook item of content may start with Portion A, e.g., Portion A is conveyed first. From Portion A, the audiobook may proceed along one branch to Portion B, but not back from Portion B to Portion A. Alternately, the audiobook may proceed along the branch from Portion A to Portion C, and then along another branch from Portion C to Portion B. It will be recognized that a path through the item of content need not pass through every portion of the item of content, such that fewer than all portions of the item of content are conveyed during the path.

Additionally, to keep the item of content "moving" (e.g., so that the item of content reaches a plot resolution or ending), some items of content may not necessarily include any cyclical paths therethrough. Put another way, some items of content may be thought of as an acyclic directed graph. Returning to the above example of Portion A, Portion B, and Portion C, it may be undesirable to use directed branches connecting Portion A to Portion B, Portion B to Portion C, and Portion C back to Portion A to restart the cycle, if for no other reason than to prevent the three portions from looping and possibly causing the user to lose interest in the item of content. In other instances, however, it may be desirable to include a cyclical path. For example, for an item of content about time travel, the user's character may become trapped in a time loop (say, repeating from A, to B, to C, then back to A, and so on) depending on his or her choices. The user may remain trapped in the time loop until he or she selects a branch leading to portion D, for instance.

In some embodiments, a user selects which branch is to be followed. An example will be illustrative. The item of content may be an audiobook, such as a science fiction audiobook set in outer space. One portion of the audiobook may be set on a spaceship. This portion may be connected to two other portions of the audiobook by branches in the audiobook. For example, one of the connected portions of the audiobook may be set on a lava planet, while the other connected portion of the audiobook may be set on an ice planet. After (or while) the portion of the audiobook set on the spaceship is conveyed, the content branching service may indicate to the user that the user may select the branch connecting the spaceship portion to the lava planet portion, or may select the branch connecting the spaceship portion to the ice planet portion. If the user selects the branch leading to the lava planet portion, the lava planet portion of the audiobook may be conveyed. If the user selects the branch leading to the ice planet portion, the ice planet portion of the audiobook may be conveyed.

While the user was given the opportunity to select between two branches in the above example, the user may be afforded the opportunity to choose from more or fewer branches as desired. Additionally, some portions of an item of content may not have any branches from which to select. These portions are sometimes referred to herein as "terminal portions." Terminal portions may represent a plot resolution of a path through the item of content. For example, returning to the science fiction audiobook above, the spaceship may crash-land and explode on the lava planet, killing the characters in the spaceship. Since all of the characters die in this portion of the audiobook, it may be undesirable to convey any other portions, since the path has reached a plot resolution. Alternately, after a terminal portion is conveyed, hypothetical "alternate endings" may be conveyed. For example, the user may be afforded the opportunity to learn what happens in other paths through the content that the user did not follow. Returning to the above example, the portion of the item of content in which the spaceship travels to the ice planet may be conveyed.

The user's selection of a branch may be specified in any number of ways. For example, the user may interact with a user interface on his or her user computing device to select a branch to follow. The user may also speak his or her selection of a branch into a microphone or receiver of his or her user computing device. The content branching service may receive the user's selection of a branch in yet other ways as well. Additionally, in some embodiments, the user does not directly or explicitly select a branch to be followed. Rather, the performance of the user on a task may be used to select the branch to be followed. These tasks may be real world tasks, such as swimming or running, or may be tasks to be performed on a user computing device, such as answering trivia questions or playing mini-games.

Moreover, multiple user computing devices conveying the same branched item of content may be used to select a group branch for some or all of the user computing devices to follow. For example, multiple user computing devices may have recently conveyed the same current portion of an audiobook. These users may vote on which branch should be followed by transmitting their selections of a branch to a content branching server. The most popular branch may be designated as the group branch, and all of the user computing devices may convey the connected portion of the item of content associated with the group branch.

Additionally, in some embodiments, users may have an opportunity to track each other's progress through the branched item of content. Returning to the above example, one or more users that voted to select a first branch may follow that branch together, whereas one or more users that voted to select a second branch may follow that branch instead. The one or more users that followed the first branch may be afforded the chance to track the progress of the one or more users that followed the second branch. For example, the portion of the item of content associated with the second branch may be conveyed in part on the user computing devices of the users that chose the first branch, and vice versa. Users may also be afforded the opportunity to communicate with one another about their selections of branches.

In some embodiments, branched content may be generated dynamically. For example, smaller portions of content may be selected based on a user's path through the item of content, and assembled to form a connected portion to be conveyed. These portions may include pre-generated content, sometimes referred to herein as a "content shell," as well as supplemental content that may be selected based on the user's path. Content shells and supplemental content may be used to avoid the time and expense of generating an entire portion of the item of content from scratch (e.g., for an audiobook, having a narrator record each possible portion of the item of content). Advantageously, content shells and supplemental content may be mixed and matched according to the user's path to generate complete portions of the item of content.

In some instances, items of content may lend themselves to further branching, even if they contain no branches as originally generated. The content branching service may identify portions of an existing item of content (also referred to herein as a "base" item of content) to which branches connected to new portions of the item of content may be added. These new portions need not have been present in the base item of content, nor do these new portions need to have been created by the same author or publisher that generated the underlying base item of content. For example, user-generated content may be used with the content branching service to supplement a base item of content. A user may provide new content that he or she generated, or may use content generated by another user or other third party. Additionally, these new portions need not be specifically generated for use with the content branching service. For example, in the Shakespeare play Hamlet, Hamlet dies after a sword fight with Laertes. A user may be interested in adding a branch to an audiobook of the play to connect a portion of the play that occurs before the sword fight to a new portion where Hamlet comes through the sword fight with Laertes unscathed and survives to become the King of Denmark. For example, the user may have recorded a new narration of this alternate ending to Hamlet. In another example, a user (or the content branching service) may obtain a narration of this alternate ending of Hamlet that was created by another user or other third party. These new branches and portions may be transmitted to a content branching server and distributed to other user computing devices to be selected and conveyed. In some embodiments, these new branches and portions are rated or otherwise quality-controlled by the content branching service or by users thereof or by other means.

Turning to FIG. 1, an illustrative network environment 100 is shown. The network environment 100 may include one or more user computing devices 102 (such as user computing devices 102A and 102B), a branch selection resource 104, a network 106, a human interaction task system 108, a content branching server 110, and a content data store 112. The constituents of the network environment 100 may be in communication with each other either locally or over the network 106.

A user computing device 102 may be any computing device capable of communicating over the network 106, such as a laptop or tablet computer, personal computer, personal digital assistant (PDA), hybrid PDA/mobile phone, mobile phone, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 102 may communicate over the network 106, for example, to obtain selections of branches from the branch selection resource 104, or to transmit selections of branches or requests for branched content to the content branching server 110. In some instances, user computing devices may communicate with each other over the network 106 as well, e.g., user computing device 102A may be able to communicate with user computing device 102B.

A user computing device 102 may generally be capable of conveying content to a user of the user computing device 102. For example, the user computing device 102 may be capable of playing audio content by directing audible output through speakers, headphones, or the like. The user computing device 102 may also be capable of displaying images or video content on a display screen. The user computing device 102 may further be capable of receiving selections of branches from a user; conveying questions about an item of content; providing tasks for the user to perform in order to select a branch; and perform other functions to implement the content branching service.

In some embodiments, a user computing device 102 also stores one or more items of content in an electronic data store. For example, the user computing device 102 may include one or more hard disk drives, solid state memories, and/or any other type of non-transitory computer-readable storage medium accessible to or integrated within the user computing device 102. These items may be retrieved from storage and conveyed by the user computing device 102. These items of content may include one or more branched portions as discussed above.

The branch selection resource 104 may generally include one or more computerized systems that may determine the selection of a branch. In some embodiments, the branch selection resource may be represented in a device similar to a user computing device 104. For example, the branch selection resource may include a laptop or tablet computer, personal computer, server computer, personal digital assistant (PDA), hybrid PDA/mobile phone, mobile phone, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like.

The branch selection resource 104 may assist in the implementation of the content branching service by providing external resources through which branches may be selected by or for the user. An example will be illustrative. In some embodiments, the branch selection resource 104 includes a video game console. A user's performance at a task in a video game conveyed by the video game console may be used to determine a selection of the branch for the user. For example, for an audiobook about tennis, the user may be prompted to play a tennis video game provided by the branch selection resource 104. The user's performance in the tennis video game may be used to determine which branch of the tennis audiobook. is selected for the user. If the user wins the tennis video game, a branch leading to a portion of the audiobook in which the user advances in a tennis tournament may be selected. If the user loses the tennis video game, a branch leading to a terminal portion wherein the user's character gives up tennis may be selected.

Other implementations of the branch selection resource 104 are possible. For example, the branch selection resource 104 may allow an individual other than a user of a user computing device 104 to make selections of branches. For example, the individual interacting with the branch selection resource 104 may provide a selection of a branch for multiple user computing devices 102 conveying the same item of content. In this respect, the individual interacting with the branch selection resource 104 may act as a "story master" or "master of ceremonies" (M.C.) for multiple user computing devices 102.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A human interaction task system 108 may be included in the network environment to assist the content branching server 110. Generally described, the human interaction task system 108 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the content branching service directs the human interaction task system 108 to pose one or more queries about an item of content to a human worker of the human interaction task system 108. The human interaction task system 108 may receive answers to these queries and transmit them to the user computing device 102 or the content branching server 110 to guide the operation of the content branching service. For example, a human worker may be asked to locate a portion of an item of content to which branched portions may be connected; to generate new branched portions of content to be connected to an existing item of content; to rate or analyze a branched portion of content that may be prospectively added to an existing item of content; or to select a branch in an item of content for one or more user computing devices 102 to follow. The human worker of the human interaction task system 108 may volunteer to respond to these and other tasks and to communicate other information about items of content and the branching thereof to the content branching server 110.

The content branching server 110 is a computing device that may perform a variety of operations to implement the content branching service. For example, the content branching server 110 may provide branched items of content a user computing device 102; receive and process multiple selections of branches to select a group branch for one or more user computing devices 102; provide new branched portions of content to be added to existing items of content; facilitate communication between multiple user computing devices 102; and perform other operations. Additional operations of the content branching server 110 are described below with respect to FIG. 2.

The content branching server 110 may be in communication with a content data store 112. The content data store 112 may electronically store items of content, such as audiobooks, musical works, electronic books, television programs, video clips, movies, multimedia content, video games, and other types of content. The content data store 112 may also maintain information about the items of content that it stores, such as information about the genre of each item of content; an author or director of each item of content; the subject of each item of content; and other information about the content, such as information about characters, settings, and moods of portions of each item of content. The content data store 112 may further store one or more new branches and branched portions of content that may be used with a base item of content, whether that base item of content is branched or unbranched. The content data store 112 may be embodied in hard disk drives, solid state memories, and/or any other type of non-transitory computer-readable storage medium accessible to the content branching server 110. The content data store 112 may also be distributed or partitioned across multiple storage devices as is known in the art without departing from the scope of the present disclosure.

A user computing device 102 and content branching server 110 may each be embodied in a plurality of components, each executing an instance of the respective content user computing device 102 and content branching server 110. A server or other computing system implementing the user computing device 102 and content branching server 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content branching server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content branching server 110 may be represented in a single physical server or, alternatively, may be split into multiple physical servers. The content branching server 110 and the branch selection resource 104 may be combined. The entire content branching server may be represented in a single user computing device 102 as well.

Additionally, it should be noted that in some embodiments, the content branching service may be executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
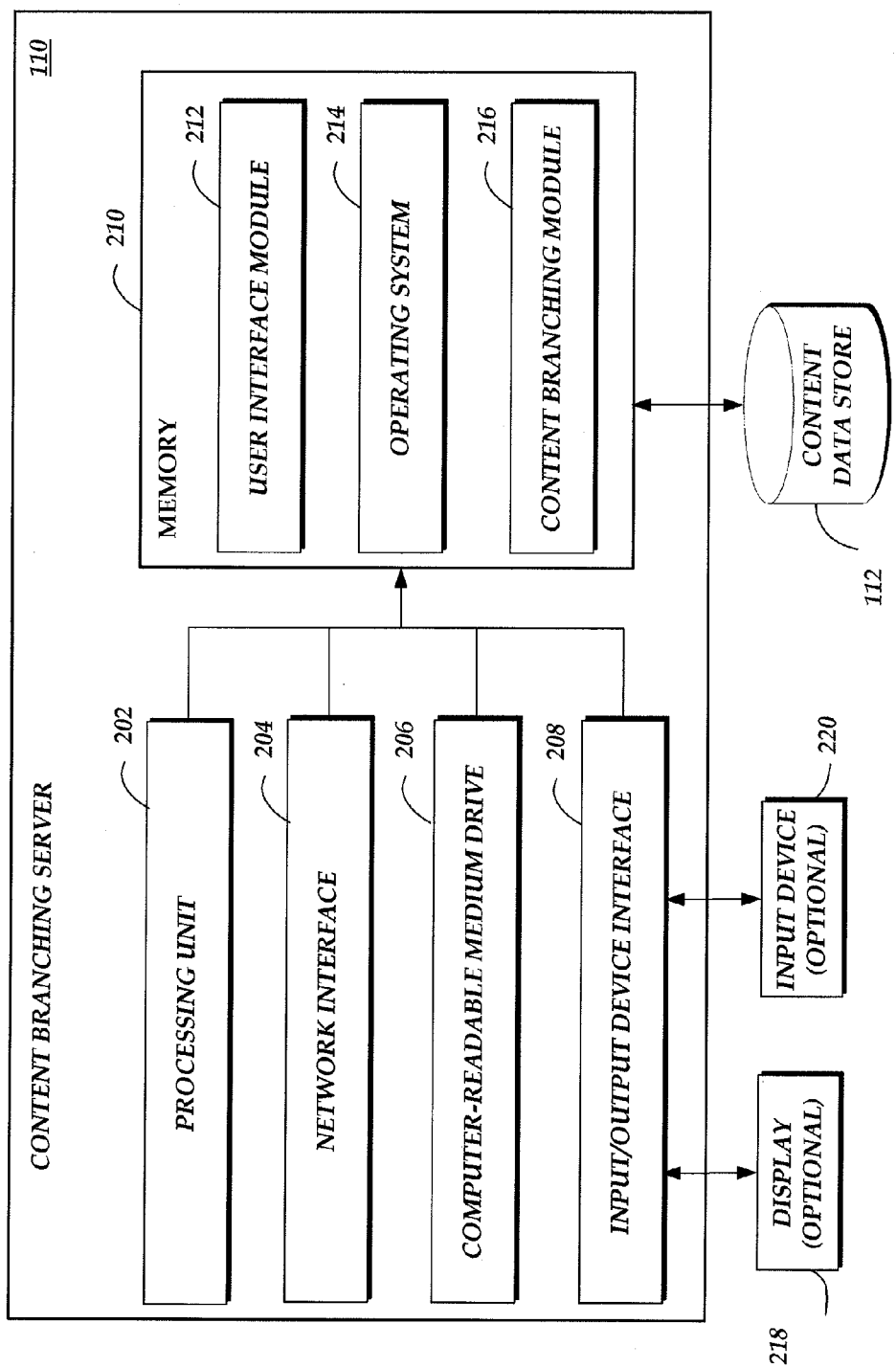
FIG. 2 is a schematic diagram of an illustrative content branching server.

FIG. 2 is a schematic diagram of the content branching server 110 shown in FIG. 1. The content branching server 110 includes an arrangement of computer hardware and software components that may be used to implement the content branching service. FIG. 2 depicts a general architecture of the content branching server 110 illustrated in FIG. 1. Those skilled in the art will appreciate that the content branching server 110 may include more (or fewer) components than those shown in FIG. 2. It is not necessary, however, that all of these generally conventional components be shown in order to provide an enabling disclosure.

The content branching server 110 includes a processing unit 202, a network interface 204, a non-transitory computer-readable medium drive 206, and an input/output device interface 208, all of which may communicate with one another by way of a communication bus. As illustrated, the content branching server 110 is optionally associated with, or in communication with, an optional display 218 and an optional input device 220. The display 218 and input device 220 may be used in embodiments in which users interact directly with the content branching server 110, such as an integrated in-store kiosk or integrated component for inclusion in an automobile, boat, train, or airplane, for example. In other embodiments, the display 218 and input device 220 may be included in a user computing device 102 shown in FIG. 1. The network interface 204 may provide content branching server 110 with connectivity to one or more networks or computing systems. The processing unit 202 may thus receive information and instructions from other computing systems (such as a user computing device 102 or the branch selection resource 104) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content branching service. The memory 210 generally includes RAM, ROM and/or other persistent or non-transitory computer-readable storage media. The memory 210 may store an operating system 214 that provides computer program instructions for use by the processing unit 202 in the general administration and operation of the content branching server 110. The memory 210 may further include other information for implementing aspects of the content branching service. For example, in one embodiment, the memory 210 includes a user interface module 212 that facilitates generation of user interfaces (such as by providing instructions therefor) for display upon a computing device such as the user computing device 102. For example, a user interface may be displayed via a navigation interface such as a web browser installed on a user computing device 102. In addition, memory 210 may include or communicate with the content data store 112. Content stored in the content data store 112 may include various types of items of content as described in FIG. 1.

In addition to the user interface module 212, the memory 210 may include a content branching module 216 that may be executed by the processing unit 202. In one embodiment, the content branching module 216 implements the content branching service. For example, the content branching module 216 may be used to receive selections of branches to be followed; add new branches and new branched portions to an existing item of content; select a branch in an item of content for one or more user computing devices 102 to follow; generate branched content from content shells; facilitate communication between multiple user computing devices 102; enable users to track each other's progress through a branched item of content (e.g., by conveying portions of items of content whose branches were selected by other users); keep track of objects and attributes that may be collected as a user traverses a path through the item of content; and perform other tasks. Example routines that may be undertaken by the content branching module 216 are disclosed in FIG. 3 and FIG. 4.

In some embodiments, the content branching service is implemented partially or entirely by one or more user computing devices 102. Accordingly, a user computing device 102 may include a content branching module 216 and other components that operate similarly to the components illustrated as part of the content branching server 110, including a processing unit 202, network interface 204, non-transitory computer-readable medium drive 206, input/output interface 208, memory 210, user interface module 212, and so forth.

Figure 3:
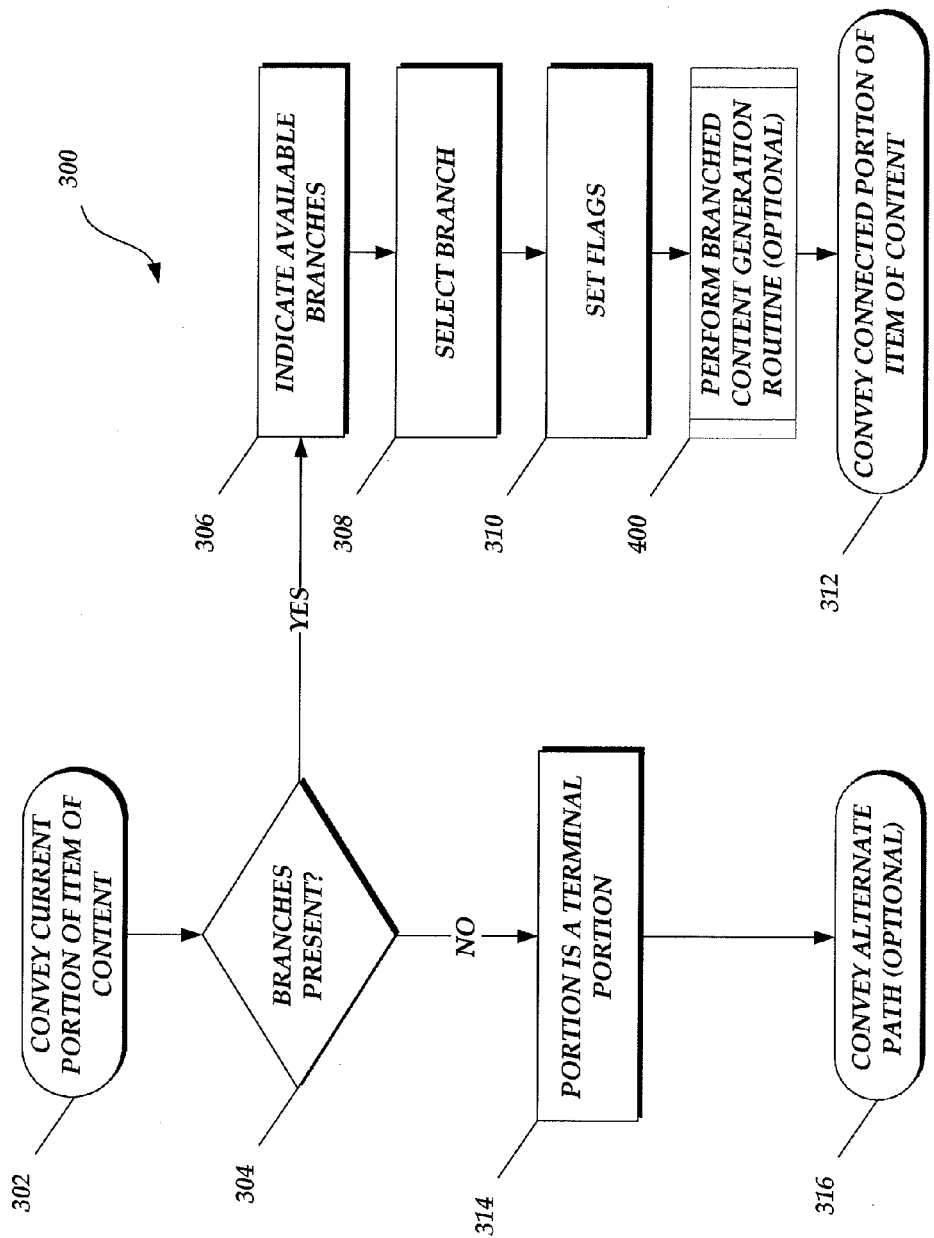
FIG. 3 is a flow diagram depicting an illustrative routine for conveying branched content.

FIG. 3 depicts an illustrative routine 300 for conveying a branched item of content. Starting in block 302, a current portion of the item of content may be conveyed. This current portion may correspond to the user's position in the item of content. In some instances, the current portion may be the first portion conveyed, e.g., the current portion may be a designated "starting point" of the item of content as indicated by markup in the item of content.

In block 304, the content branching service may determine if there are any branches from the current portion of the item of content to another connected portion of the item of content. These branches may be identified in a number of ways. In some embodiments, the item of content contains embedded markup that indicates which portions of the item of content are connected by which branches. Paths through the item of content, which may include one or portions of the item of content connected by one or more branches, may likewise be identified through the use of embedded markup. In other embodiments, the content branching service may break an item of content down into portions, and determine which portions should be connected along which branches based on information contained in the portions of the item of content. For example, branches may be used to connect portions of the item of content featuring a common character, geographical setting, historical setting, mood, or the like. More information on identifying characters, settings, and moods in a portion of an item of content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications are hereby incorporated by reference in their entireties. Branches may also be assigned to the item of content by a human worker of the human interaction task system. For example, the content branching service may provide the human worker with a list of portions of the item of content, convey the portions of the item of content, and ask the human worker to identify which portions should be connected by a branch.

The availability of a branch is in some embodiments determined by a path previously followed by the user through the item of content, e.g., by which portions of the item of content were conveyed before the current portion of the item of content was reached. For example, the content branching service may identify objects and attributes that may be present in the previously conveyed portions of the item of content, and may optionally use those objects and/or attributes to constrain the user's path through the item of content. These objects and attributes are sometimes referred to herein as "flags." For example, a portion of an item of content may discuss a locked door. In order to select a branch leading to a portion in which the door is opened, the user may need to have previously selected a branch leading to a portion in which the user acquired a key for the door, e.g., to have selected branches to cause the content branching service to set a flag indicating that the key was acquired. In another example, a user may have previously selected a branch leading to a portion of an item of content in which the user's character has run a long distance. The user's character may be given an attribute indicating that the user's character is exhausted. Accordingly, the user may not be able to make a subsequent selection of a branch in which the user's character has to perform another arduous physical task, such as climbing up a wall, because the user's character has the exhausted attribute.

It should be noted that in some embodiments, the user need not select a branch for a flag to be set. This aspect may advantageously be incorporated to provide a seamless user experience. For instance, a question may be conveyed to the user, and based on the user's answer (rather than the user's selection of a branch), a flag may be set. As a specific non-limiting example, while a portion of the branched item of content is conveyed, the user may be asked to indicate his or her favorite color to determine whether or not a later-occurring branch in which the user's character successfully crosses a bridge is available. If the user answers "blue," a blue flag may be set. If the user answers "yellow," a yellow flag may be set. Accordingly, if the user previously answered blue, the later branch in which the user has successfully crossed a bridge is automatically selected. On the other hand, if the user previously answered yellow, a branch in which the user does not successfully cross the bridge is automatically selected.

Additionally, whether a branch is available to be selected may be determined based on whether a flag has been previously set, regardless of whether the flag was set in connection with the selection of a branch, or "seamlessly" set as described above. Returning to the above example, a question may be conveyed in which the user is asked to indicate his or her favorite color. If a user answers "blue" as his or her favorite color, a first set of one or more branches may be available to be selected. If the user answers "yellow" as his or her favorite color and the yellow flag is set, a second set of one or more branches may be available to be selected. The first set of branches and the second set of branches may have one or more branches in common, or may have no branches in common.

If there are available branches present, the content branching service may indicate to a user which branches are available to be selected in block 306. For example, the content branching service may provide a user interface on a display screen of a user computing device to indicate which branches are available to be selected by the user. The content branching service may also (or instead) audibly convey an indication of the branches available for selection In block 308, the content branching service may receive a selection of a branch to be followed. As discussed above, selections of a branch may be specified through an utterance of the user spoken into a microphone of a user computing device; an interaction of the user with a selectable control of a user interface; or in other ways.

Additionally, in some embodiments, the user does not necessarily explicitly or directly select a branch to follow, e.g., the user may not need to provide input, the user may not be given the option to provide any input regarding the selection of the branch. Accordingly, a notification that branches are available is not necessarily conveyed to the user in some embodiments. For example, an action of the user, a performance of the user at a particular task, or a flag set previously by the user (e.g., by answering a question as discussed above) may be used to automatically select a branch. The user's performance level at the task (how quickly the user completed the task, how many questions related to the task the user got correct, etc.) may be used to make the automatic selection. For example, an audiobook may contain a reference to a shark swimming in the same water as the user's character. The user may have the option of selecting a branch of the audiobook in which the user's character attempts to flee the shark by swimming away. The content branching service may then request that the user swim one hundred meters and provide his or her time in the one hundred meters of swimming to the content branching service. If the user's swimming time is less than or equal to a particular threshold time, a branch may be followed to a portion of the audiobook in which the user's character successfully escapes the shark. If the user's swimming time is above the threshold time, a branch may be followed to a portion of the audiobook in which the user's character is eaten by the shark.

Additionally, in some embodiments, branches are chosen automatically and randomly by the content branching service. Flags may be used to determine the probability as to whether a particular branch is chosen. An example will be illustrative. A user listening to an audiobook about a football game may have taken a path through the branched item of content such that the wind is at the home team's back on the final play of the game. The user may then select a branch of the item of content in which a field goal is attempted. If the home team has the wind at its back, the content branching service may, after conveying the portion of the item of content relating to the field goal attempt, use probability to select a branch to a portion relating the outcome of the field goal attempt. For example, a branch leading to a portion in which the field goal is good may be automatically selected 90% of the time, while a branch leading to a portion in which the field goal is no good may be automatically selected 10% of the time. On the other hand, if the user did not take a path through the audiobook such that the wind was at the home team's back, the content branching service may instead automatically select a branch leading to a portion in which the field is good with 50% probability, while the branch leading to the portion in which the field goal is no good may be automatically selected 50% of the time.

Actions or tasks may also be performed with the user computing device that is conveying the item of content, or with another computing device in communication either with the user computing device or with another device implementing the content branching service. For example, the user computing device or other computing device may convey a mini-game to the user, or convey questions to the user about the item of content. The user's performance on the mini-game or questions may be used to automatically select a branch to be followed.

It should be noted that in some embodiments, one or more computing devices convey the same item of content. Users may as a group progress through the branched portions of the item of content. For example, the same portion of an item of content may be conveyed on one or more user computing devices. A selection of a branch may be received from each of the users at their respective user computing devices, and then relayed to a content branching server. The content branching server may receive the selections and then process them to select a group branch to be followed by each of the user computing devices conveying the item of content. In one embodiment, the most popular branch (e.g., the branch that receives the most selections) is designated as the group branch. In this way, the users of the user computing devices may vote on a branch to select.

In some embodiments in which one or more user computing devices convey the same item of content, a master user computing device is designated, and the selection of the branch that the content branching server received from the master user computing device is used to select the group branch. A user computing device may be designated as a master user computing device in any of a number of ways. In one embodiment, the master user computing device is selected by identifying a user computing device associated with a user that had the highest performance level on a task given by the content branching service. For example, the user with the highest score on a trivia quiz about the item of content may have his or her user computing device designated as the master computing device. In another embodiment, the master user computing device designation rotates among the user computing devices conveying the item of content with each selection of a branch. In still another embodiment, the users of the user computing device may use the content branching server to hold an election of a master user computing device. Still other ways of designating a master user computing device are possible.

It should be noted that if there is only one branch leading away from the current portion of the item of content, the portion connected by the branch to the current portion of the item of content may be automatically selected and conveyed, without necessarily receiving a selection from a user. Thus, in some instances, block 306 and block 308 may be omitted from the routine 300.

With a branch selected in block 308, flags may be set associated with the selection of that branch in block 310. As discussed above with respect to block 304, flags may generally relate to objects, attributes, and/or events related to selections of branches.

The content branching service may optionally call a branched content generation routine 400 to dynamically generate a connected portion of an item of content to be conveyed in response to the selection of the branch. Turning to FIG. 4, which depicts an illustrative routine 400, the content branching service may in block 402 identify which flags have been set previously along the user's path through the item of content. As discussed above, these flags may be set when a portion of an item of content is conveyed after its respective branch is selected.

In block 404, the content branching service may select a content shell based on the previously set flags. Generally described, a content shell may include pre-generated content which may be dynamically supplemented and filled in based on any previously set flags to form a portion of the item of content. In some embodiments, only one content shell is used. Returning to the above example of a football game audiobook, a portion of the football game audiobook may be about the final play, and the user may have the opportunity to select among branches leading to different portions of the audiobook describing different final plays, such as a Hail Mary, field goal, and the like. However, regardless of which play is selected, the football will always be snapped by the center to the quarterback in the item of content. Accordingly, pre-recorded narration reciting the ball being snapped may be used as the content shell.

In other embodiments, multiple content shells are used. Continuing with the example of a football game audiobook, the user may have the option of calling a play immediately, or calling a timeout. If the user selects the branch leading to a portion of the item of content in which the play is called immediately, a flag related to the play being called may be set and the content shell relating to the ball being snapped may be selected. Alternately, if the user selects the branch leading to a portion of the item of content in which a timeout is called, a flag related to a timeout being taken may be set and pre-recorded narration reciting a description of the timeout being taken may be used as the content shell instead.

In block 406, the content shell selected in block 404 may be filled in with supplemental content based on the selection of the branch. For examples, a flag set in block 310 associated with the selection of the branch may be used to fill in the content shell. Returning to the football audiobook example, a user may be given a choice of branches corresponding to different plays to be run. If a user selects the Hail Mary branch, a Hail Mary flag may be set and used to fill the content shell. For example, if the content shell selected in block 404 included audio narration such as "The center snapped the ball to the quarterback," the content shell might be filled with a supplemental portion of narration related to the Hail Mary flag, such as "All of the wide receivers ran deep routes as the quarterback rolled out to his left."

In block 408, interactions may optionally be identified between the flags. Generally described, these interactions may govern the selection of supplemental content to improve the narrative coherence of the item of content. For example, a user's previous selections of branches of content may have cause two events to occur in the item of content. A logical consequence of these first two events might be a third event.

In some embodiments, the interactions are governed by multiple if-then statements based on whether certain flags have been set. For example, for if certain flags have all been set, one outcome may occur, whereas a different outcome may occur if one of the flags was not set. Returning to the previous example of a football audiobook, the user may have previously selected a branch setting a wind flag such that the home team has the wind at their backs in the fourth quarter. The user may have presently selected a branch setting a flag indicating that the final play of the fourth quarter will be a field goal attempted by the home team. Because the home team has the wind at its back, the kicker for the home team will make the field goal, a logical consequence of having the wind at the home team's back. These interactions may be identified in advance by an author or publisher of the item of content, e.g. by embedding markup in the item of content. A scripting language may also be used to govern these interactions.

In block 410, the content generation routine finishes the dynamically generated portion of the item of content. As discussed above, however, the branched content generation routine 400 is optional, and it is well within the spirit and scope of the present disclosure to use pre-generated branched portions of content. Likewise, pre-generated and dynamically generated portions of content may be used with the same item of content.

Returning to FIG. 3, the connected portion of the item of content associated with the branch selected in block 308 may be conveyed in block 312. In some embodiments, the routine 300 performs multiple iterations, such that the connected portion conveyed in block 312 in a first iteration is the current portion of the item of content in the second iteration.

If there are no branches from the current portion of the item of content to a connected portion of the item of content, the current portion of the item of content may be deemed a terminal portion of the item of content in block 314. As discussed above, a terminal portion of the item of content may a portion in which a path through the item of content reaches a resolution, such as a plot resolution. For example, for an audiobook about a football game, the terminal portions might relate to the final outcome and score of the game: either the home team won, or the away team won.

Optionally, portions of the item of content that fall along an alternate path may be conveyed in block 316. The content branching service may enable a user to learn the answer to the question, "What if I had made a different choice earlier?" Returning to the above example of a football game audiobook, the user may be given the opportunity to select a play to be run as the final play of the game. The user may have the option of selecting a branch leading to a portion of the item of content in which the home team throws a Hail Mary. If the portion of the item of content in which the home team throws a Hail Mary is a terminal portion of the item of content, the content branching service may, after conveying the Hail Mary portion, convey a portion of the item of content in which the home team settles for a field goal to send the game into overtime. In another example, in embodiments in which multiple user computing devices convey the same item of content and group branches are selected, users may be given the opportunity to see what portions of content would have been conveyed if different selections were considered: what might have happened if Bill's selected branch were followed instead of Suzy's selected branch.

Figure 5A:
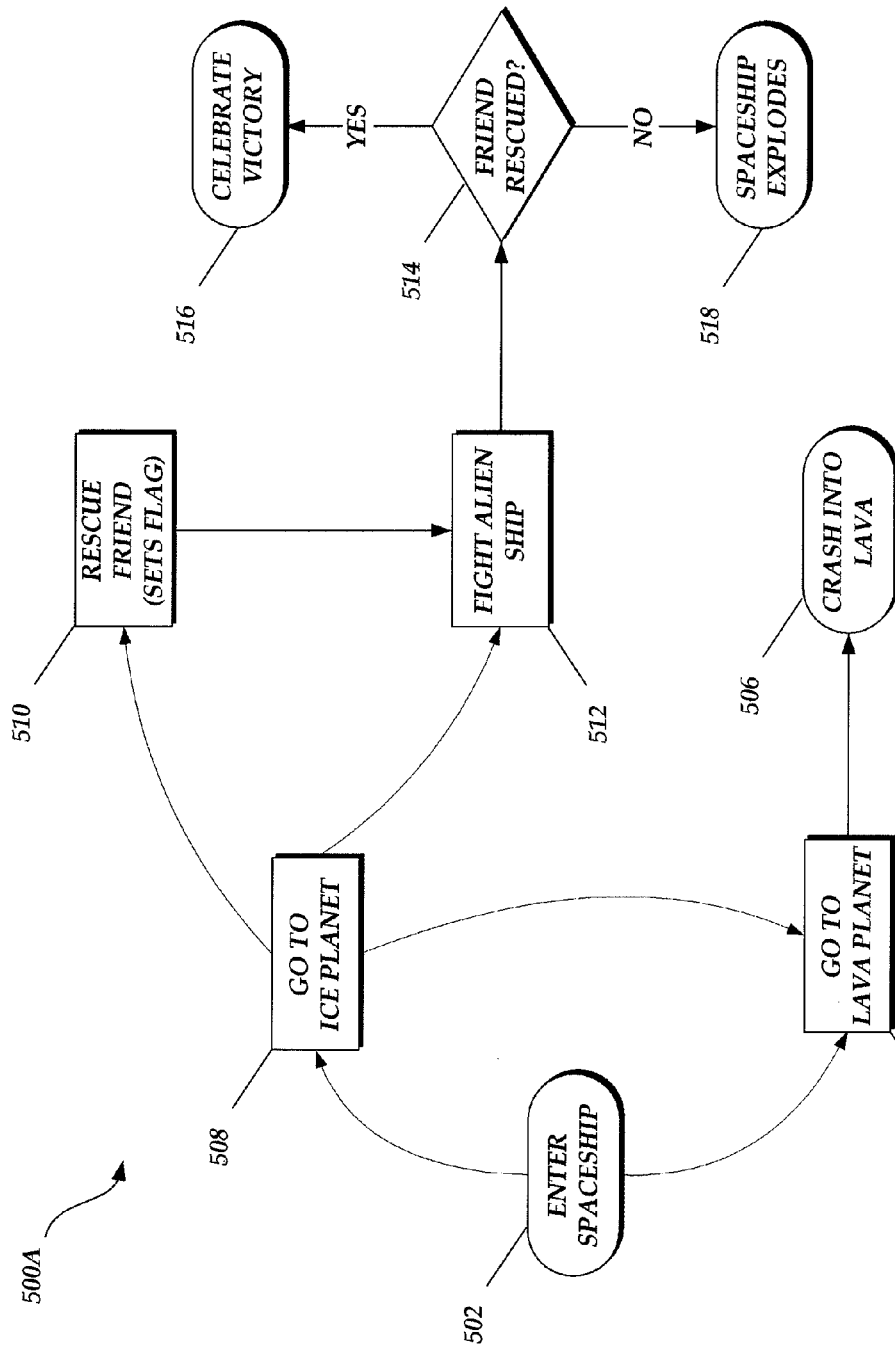
FIG. 5A and FIG. 5B are flow diagrams depicting illustrative paths through an item of branched content.
Figure 5B:
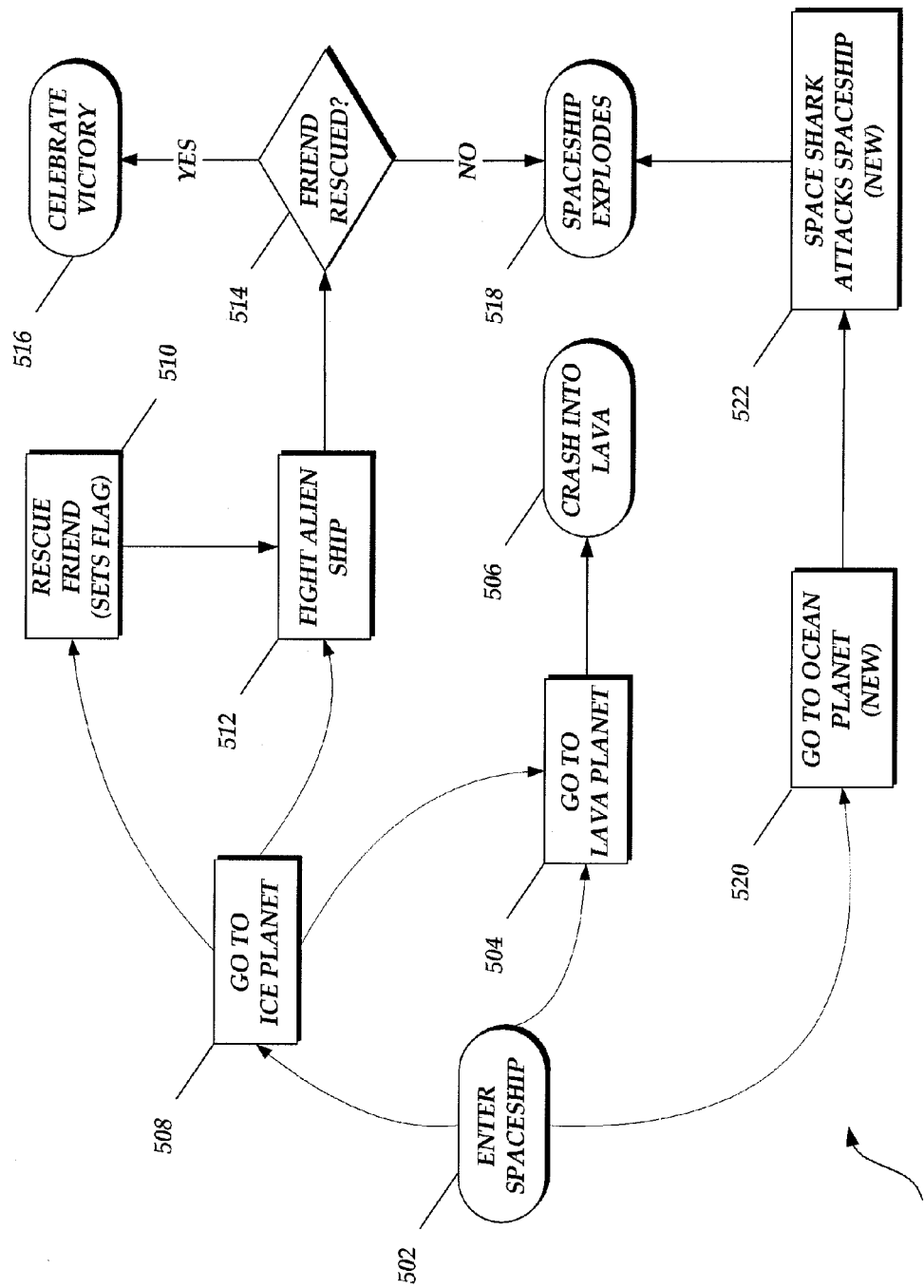
Figure 6:
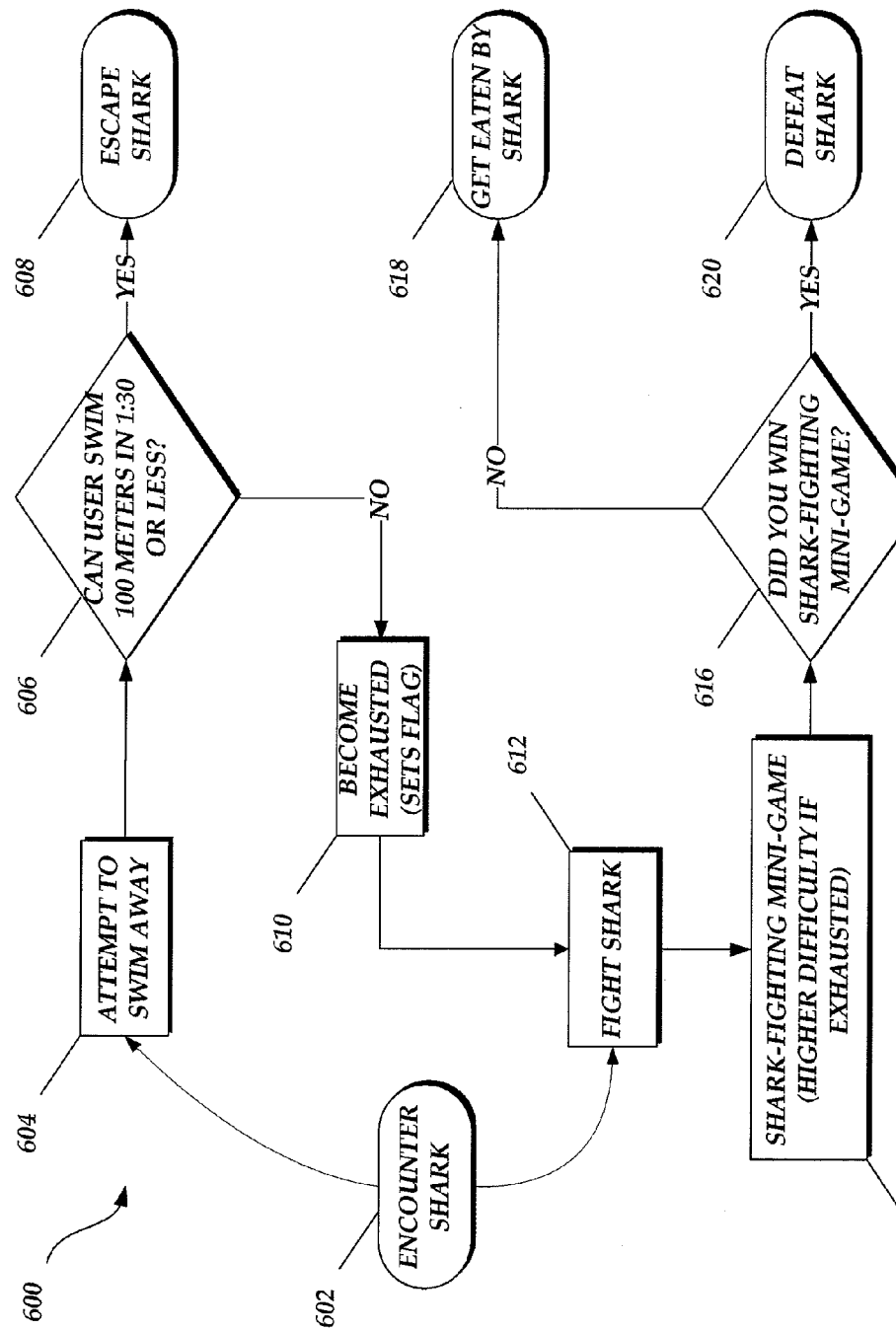
FIG. 6 is a flow diagram depicting illustrative branched paths through an item of branched content.

FIG. 5A, FIG. 5B, and FIG. 6 represent branched items of content in schematic form. For these figures, curved arrows indicate paths that may be selected by a user or by one or more users. Straight arrows or arrows at right angles indicate branches that may be automatically selected by the content branching service. Diamonds indicate a check to see if a flag is set or if a task is performed, which may affect which branch is selected or which branches are available to select. Blocks are used to represent portions of an item of content. Rosettes are used to indicate current portions of an item of content and terminal portions of an item of content. However, as discussed above, in some embodiments, once a branch leading to a connected portion is selected, the connected portion becomes the new current portion.

Turning to FIG. 5A and FIG. 5B, in which like reference numerals reference like portions, several paths are available through the illustrative science fiction branched items of content 500A and 500B. Starting from the current portion 502, the user may select the branch leading to the lava planet portion 504 or the ice planet portion 508.

If the user selects the branch leading to the lava planet portion 504, after the lava planet portion 504 has been conveyed, the content branching service may automatically select the branch leading to the crash into lava portion 506. The crash into lava portion 506 is a terminal portion in this example, as it has no branches leading to another portion of the item of content and represents a logical conclusion or resolution to the plot of the item of content.

The user may alternately select a branch leading from the ice planet portion 508 leading to the rescue friend portion 510. If the branch leading to the rescue friend portion 510 is selected and/or the rescue friend portion 510 is conveyed, a flag may be set indicating that the friend has been rescued.

The fight alien ship portion 512 may be selected in one of two ways in this example. First, the user may voluntarily select the branch leading from the ice planet portion 508 to the fight alien ship portion 512. Second, the user may voluntarily select the branch leading from the ice planet portion 508 to the rescue friend portion 510. The content branching service may then automatically select the branch leading from the rescue friend portion 510 to the fight alien ship portion 512.

The content branching service may, after conveying the fight alien ship portion 512, proceed to the friend rescued flag check 514. As discussed above, in some embodiments, flags set by previous selections of branches may be used to determine subsequent selections of branches. Here, if the branch leading to the rescue friend portion 510 was selected along the path that led the user to the flag check 514, the rescue friend flag would have been set and the content branching service may automatically select the celebrate victory terminal portion 516 to be conveyed, bringing the path through the item of content to a close. However, if the branch leading to the rescue friend portion 510 was not selected along the path that led the user to the flag check 514 (e.g., the user went from the spaceship portion 502 to the ice planet portion 508 and then to the fight alien ship portion 512), the content branching service may automatically select the spaceship explodes terminal portion 518, bringing the path through the item of content to a close.

The illustrative item of content 500A shown schematically in FIG. 5A may be augmented with new branched portions of content. For example, an author or publisher of a base item of content may provide new branches and portions of content to be used in conjunction with the base item of content. Alternately, these branches and portions may be provided by a user of the content branching service to the content branching server, which may distribute them to other user computing devices. For example, the user may generate new branches or portions of content (e.g., by recording new narration), or the user may obtain content generated by another third party (e.g., another user) and provide it to the content branching service.

The content branching server may also rate or analyze prospective additions to a base item of content to determine whether a new portion of content is compatible with the base item of content. If a new portion of content is compatible with a base item of content or portion thereof, a new branched item of content may be generated that includes the new portion of content and the base item of content, with the new portion of content being connected by a branch to a selected portion of the base item of content.

In one example, a new portion of content and a base item of content may be deemed compatible if they have a common character, geographical setting, historical setting, mood, or the like. More information on identifying characters, settings, and moods in a portion of an item of content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications were previously incorporated by reference in their entireties above.

In another example, clustering algorithms may be used to determine the compatibility of a new portion with a base item of content. Generally described, these clustering algorithms determine how frequently certain words, concepts, ideas, etc. appear together in a particular item of content. These clustering algorithms may be used to compute a coherence value, which may quantitatively reflect how compatible the new portion of content is with the base item of content. Relatively compact clusters may contribute to a relatively high coherence value, while relatively diffuse clusters may contribute to a relatively low coherence value. Coherence value thresholds may be set as desired to determine whether a new portion is acceptably compatible with the base item of content. For example, a cluster including a stagecoach, a revolver, and a cowboy may be very compact, as these objects and attributes frequently appear together in items of content set in the Wild West. On the other hand, a cluster including a stagecoach, a laser gun, and a pirate may not be very compact, as the objects and attributes may rarely, if ever appear together in an item of original content. Accordingly, a new portion including a stagecoach may be considered compatible with respect to a base item of content involving a cowboy and a revolver, as stagecoaches may be clustered tightly with revolvers and cowboys. More information regarding the use of clustering algorithms to evaluate the coherence of an item of content may be found in U.S. patent application Ser. No. 13/434,538, entitled "CONTENT CUSTOMIZATION" and filed on Mar. 29, 2012. The disclosure of this application is hereby incorporated by reference in its entirety.

In some instances, these branches may depart from a portion of the base item of content to a new portion of the item of content not present in the base item of content. Additionally, a branch may lead from a new portion of the item of content back to a portion of the base item of content. Furthermore, a branch may be added leading from a terminal portion in the base item of content to new portion of the item of content, such that the terminal portion in the base item of content is no longer a terminal portion.

FIG. 5B includes the base item of content 500A illustrated in FIG. 5A in addition to new portions 520 and 522. From the spaceship portion 502, the user may be additionally afforded the opportunity to select the branch leading to the new ocean planet portion 520. Should the user select the branch leading to the new ocean planet portion 520, the content branching service may automatically select the branch leading to the new space shark portion 522. The content branching service may then automatically select the branch leading from the new space shark portion 522 to the spaceship explodes terminal portion 518 present in the base item of content.

FIG. 6 depicts an illustrative item of content 600 in schematic form. In this branched item of content, selections of branches may be made based on the user's performance in various tasks. This particular illustrative item of content pertains to the user's character's encounter with a shark.

A shark encounter portion 602 may be conveyed to start a path through the item of content. From the shark encounter portion 602, the user may have the option to select a branch leading to the swim away portion 604. If the branch leading to the swim away portion 604 is selected by the user, the content branching service may then automatically select a branch leading to the swimming task portion 606. The user may be asked to perform the task (swimming one hundred meters) and to input his or her performance level for the task (inputting his or her time in the hundred meters), which may then be provided to the content branching service to select a branch automatically or to determine which branches are available to be selected by the user based on the user's performance level for the task.

Returning to swimming task portion 606, if the user performs the swimming task in one minute and thirty seconds or less and indicates as such to the content branching service (e.g., by entering his or her time through a user interface displayed on a user computing device), the content branching service may automatically select the escape shark terminal portion 608, which may bring the user's path through the item of content to a close.

If the user's performance level does not meet the threshold (e.g., it takes the user too long to swim one hundred meters), the content branching service may automatically select the branch leading from the swimming task portion 606 to the "become exhausted" portion 610, whereupon an exhausted flag may be set. The content branching service may then automatically select the branch lead from the become exhausted portion 610 to the fight shark portion 612.

Alternately, the user may select the branch leading directly to the fight shark portion 612 from the shark encounter portion 602. Regardless of how the user reaches the fight shark portion 612, the content branching service may automatically select the branch leading to the shark-fighting mini-game 614, which may be conveyed on a user computing device or by a branch selection resource (e.g., a video game console or other computing device in communication with the user computing device and/or the content branching server). The shark-fighting mini-game may be increased in difficulty if the exhausted flag was set in the become exhausted portion 610, e.g., if the user followed the path from the shark encounter portion 602 to swim away portion 604, then to the swimming task portion 606, then to the become exhausted portion 610 (for which the exhausted flag may be set), then to the fight shark portion 612, and finally to the mini-game portion 614. If the user wins the mini-game portion 614, a winning flag may be set.

The content branching service may then automatically select the branch leading from the mini-game portion 614 to the flag check 616. If the winning flag was not set by the content branching service based on the user's performance in the mini-game portion 614, the content branching service may automatically select the branch leading from flag check 616 to the terminal get eaten by shark portion 618, which may bring the user's path through the item of content to a close, as the user's character has been eaten by a shark. Alternately, if the winning flag was set, the content branching service may automatically select the defeat shark portion 620, which may bring the user's path through the item of content to a close, as the user's character has emerged victorious.

The schematic diagrams in FIG. 5A, FIG. 5B, and FIG. 6 may also be incorporated into user interfaces for selecting branches to follow in an item of content. For example, in one embodiment, selectable controls corresponding to representations of the current item of content and any branches that the user may select leading from the current item of content to a connected portion of content are displayed. As the user selects branches and as more items of content are conveyed, more selectable controls may become available, corresponding to further connected portions. For example, in FIG. 5A, at first, selectable user interface controls may only initially be displayed for the enter spaceship portion 502, the lava planet portion 504, and the ice planet portion 508. If the user selects the branch corresponding to the ice planet portion 508, selectable controls corresponding to representations of the rescue friend portion 510 and the fight alien ship portion 512 may be displayed by the user interface. By only gradually revealing which branches are available to be selected, the content branching service may provide users of the content branching service with surprises as the users follow a path through the item of content.

Alternately, the content branching service may allow a user to select any of the portions, including portions in the midst of a path. If the user selects a portion in the midst of a path, the content branching service may convey part of a portion of the item of content from which the user could have arrived at the selected portion, prior to conveying the portion in the midst of the path. For example, if the user selects the ice planet portion 508 without having previously selected the spaceship portion 502, part of the spaceship portion 502 may be conveyed before the ice planet portion may be conveyed.

Figure 7:
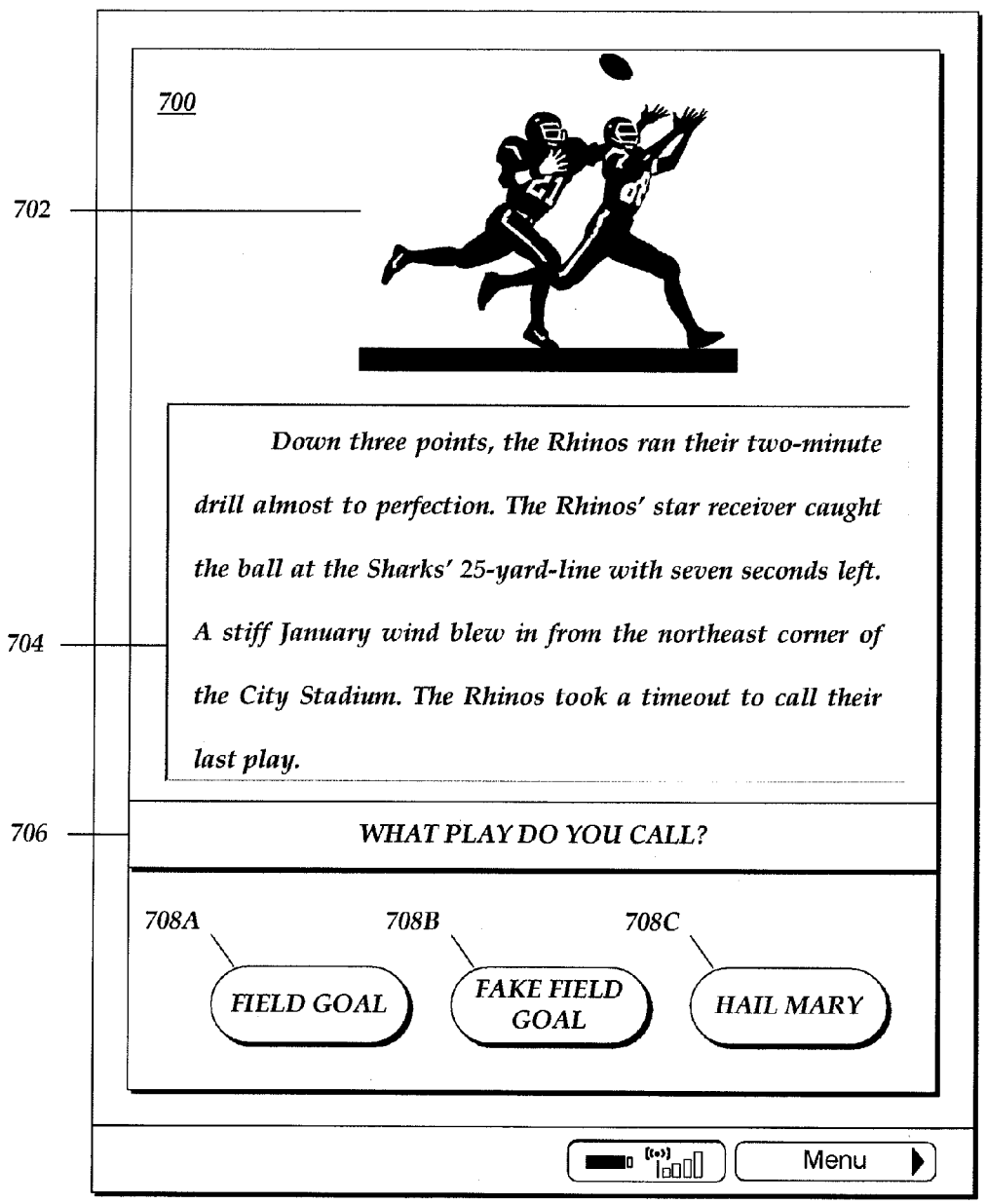
FIG. 7 is a pictorial diagram depicting an example user interface for conveying an item of branched content.

FIG. 7 is a pictorial diagram depicting an illustrative user interface 700. The user interface may include a visual indicator 702 associated with the portion of the item of content; a portion display pane 704, which may convey the item of content; a notification pane 706; and selectable user interface controls 708A-708C.

The user interface 700 may include a visual content pane 702 in which a portion of an item of content that includes visual content may be displayed. For example, a video clip, image, or animation may be displayed in the visual content pane 702. Alternately, a schematic branched content diagram similar to that shown in FIG. 5A, FIG. 5B, or FIG. 6 may be shown so that the user can track his or her path through the item of content.

The user interface 700 may also include a textual content pane 704. In some embodiments, the textual content pane 704 displays a portion of an electronic book that corresponds to the current portion of the item of content. In other embodiments, the textual content pane 704 displays textual content that is synchronized to audio content that corresponds to the current portion of the item of content and conveyed by the content branching service. More information pertaining to synchronizing items of textual and audio content may be found in U.S. patent application Ser. No. 13/604,482, entitled "IDENTIFYING CORRESPONDING REGIONS OF CONTENT" and filed on Sep. 5, 2012; and in U.S. patent application Ser. No. 13/604,486, entitled "SELECTING CONTENT PORTIONS FOR ALIGNMENT" and filed on Sep. 5, 2012. The disclosures of both of these applications are hereby incorporated by reference in their entireties. Further information pertaining to synchronizing items of textual and audio content may be found in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications are also hereby incorporated by reference in their entireties.

The notification pane 706 may convey in visual or textual format that branches are available to be selected by the user. The notification may also (or instead) be conveyed in audio format, e.g., by directing audio output through speakers or headphones associated with a user computing device. If the notification is conveyed in audio format, the user interface 700 may not necessarily include a notification pane 706.

To receive a user's selection of a branch, selectable user interface controls 708A-708C may be provided in the user interface 700. A user may interact with the one or more response controls 708A-708C to provide a selection of a branch, e.g., by clicking a selectable user interface control 708A-708C (if on a display screen) or by tapping user interface control 708A-708C (if displayed on a touchscreen). In embodiments where the user speaks his or her selection of a branch into a microphone of the user computing device, the selectable user interface controls 708A-708C need not be provided. Likewise, if the content branching service will automatically make the selection of the branch from the current portion of the item of content, the selectable user interface controls 708A-708C need not be provided.

Figure 8:
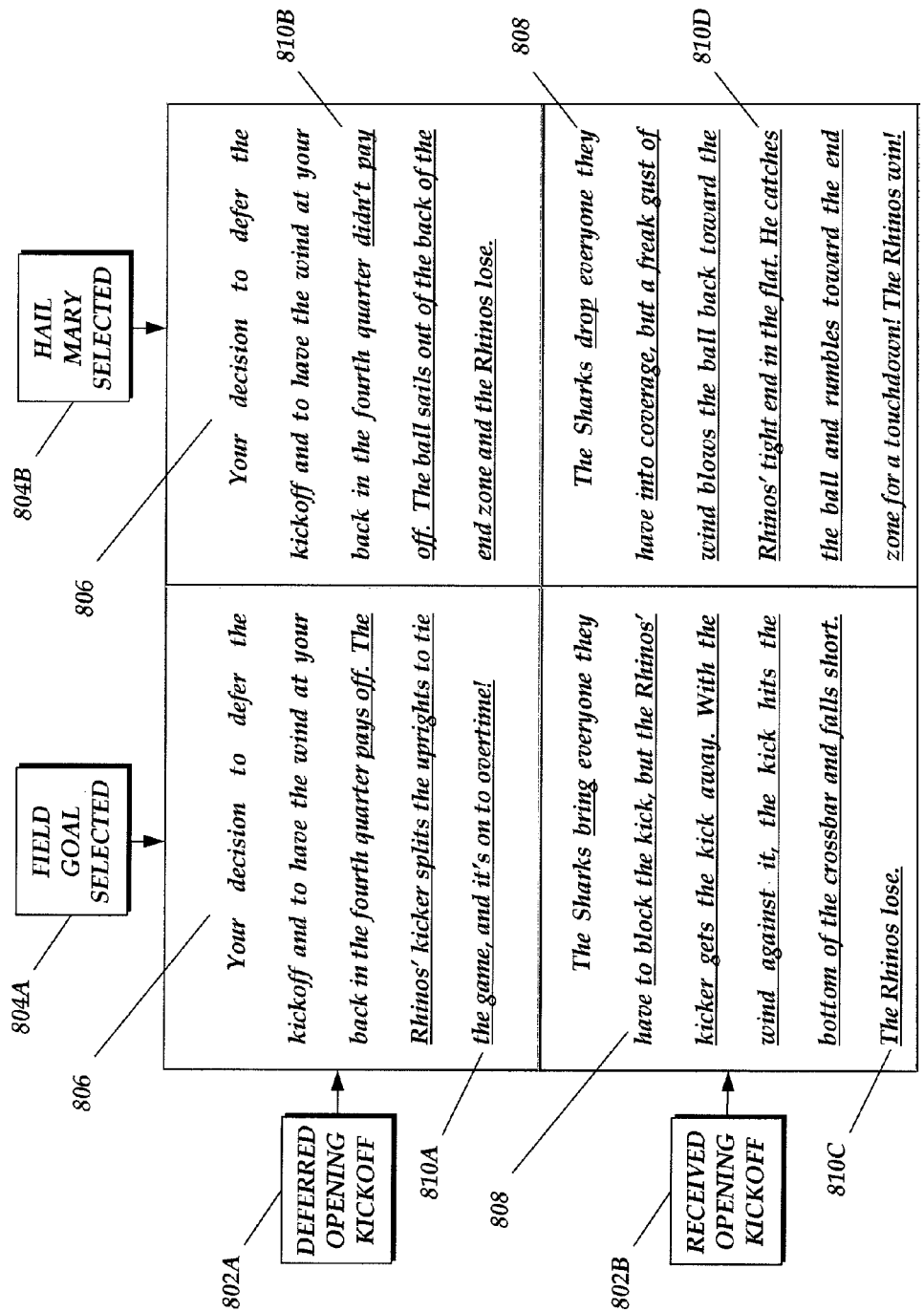
FIG. 8 is a pictorial diagram depicting illustrative content shells and generated content.

FIG. 8 depicts illustrative filled content shells, as might be used to dynamically generate portions of items of content to be conveyed. An illustrative routine for generating such filled shells is shown in and discussed above with respect to FIG. 4. These dynamically generated portions may each be connected to an existing portion of the item of content by a branch, and conveyed in response to a selection of its respective branch. The illustrative portions shown in FIG. 8 each include a shell and a supplemental portion. As discussed above, these shells and supplemental portions may be mixed and matched based on which flags were set.

In this example item of content, based on a user's previous selection of a branch leading from a kickoff current portion to another portion, either a deferred opening kickoff flag 802A may have been set or a received opening kickoff flag 802B may have been set. Likewise, based on another of the user's previous selections of a branch, either a field goal flag 804A may have been set or a Hail Mary flag 804B may have been set.

The content shell 806 (shown as plain text for illustrative purposes) may be selected if the deferred opening kickoff flag 802A was set. Alternately, the content shell 808 (shown as plain text for illustrative purposes) may be selected if the received opening kickoff flag 802B was set.

The content shells may be filled with supplemental content. In some embodiments, this supplemental content is determined by the interaction of more than one flag, e.g., the interaction of either of the kickoff flags 802A or 802B with either of the play selection flags 804A and 804B. From top left, the deferred opening kickoff flag 802A may interact with the field goal selected flag 804A such that based on the user's path through the item of content, the wind would be at the field goal kicker's back. Accordingly, the supplemental portion 810A (shown as underlined text for illustrative purposes) selected for this combination of flags may relate to the field goal kicker splitting the uprights as a logical consequence of the kicker having the wind at his back. Other interactions are possible, as shown by supplemental portions 810B, 810C, and 810D.

It should be noted that the content branching service may be employed with many different types of items of content. For example, the content branching service may be employed with animations, electronic books, electronic periodicals, movies, television programs, audiobooks, songs, movies, television programs, multi-media content, and the like. The item of content used with the content branching service may be a fictional item of content or a non-fictional item of content.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
under control of a computing system comprising one or more computing devices configured with specific computer executable instructions to perform the following steps:
presenting a current portion of an audiobook;
identifying a first branch and a second branch in the audiobook, wherein the first branch connects the current portion of the audiobook to a first connected portion of the audiobook, the second branch connects the current portion of the audiobook to a second connected portion of the audiobook, and wherein the first connected portion is different than the second connected portion;
presenting a notification that a selection may be made among the first branch and the second branch;
receiving a selection of the first branch;
identifying two or more flags that have been set prior to receiving the selection of the first branch, wherein a first flag of the two or more flags was previously set in association with a first prior branch selection that was received in association with presentation of a first portion of the audiobook preceding the current portion, and wherein a second flag of the two or more flags was previously set in association with a second prior branch selection;

in response to the selection of the first branch, selecting a content shell associated with the first branch;

selecting supplemental content based at least in part on the two or more flags;

adding the supplemental content to the content shell to generate a connected portion of the audiobook associated with the first branch; and presenting the connected portion of the audiobook associated with the first branch.

2. The computer-implemented method of claim 1, wherein the notification is an audible notification.

3. The computer-implemented method of claim 1 further comprising causing display of a user interface configured to receive the selection of the first branch.

4. The computer-implemented method of claim 3, wherein the user interface comprises a first selectable control for the first branch and a second selectable control for the second branch, and wherein the selection of the first branch is received through the first selectable control.

5. The computer-implemented method of claim 1, wherein the selection of the first branch is received as an utterance captured by a microphone of a user computing device.

6. The computer-implemented method of claim 1, wherein selecting the supplemental content comprises matching the supplemental content to the content shell based on the two or more flags.

7. The computer-implemented method of claim 1, wherein one of the two or more flags indicates a prior branch selection.

8. The computer-implemented method of claim 1, wherein one of the two or more flags indicates an attribute or an object present within content previously presented in response to a prior branch selection.

9. The computer-implemented method of claim 1, wherein selecting the supplemental content comprises analyzing interactions between the two or more flags.

10. The computer-implemented method of claim 9, wherein the interactions between the two or more flags are analyzed based on at least one of markup information or a script associated with the audiobook.

11. A system comprising:
an electronic data store configured to store an audiobook; and
a computing device in communication with the electronic data store, the computing device configured to:
present a current portion of the audiobook;
identify a first branch and a second branch in the audiobook, wherein the first branch connects the current portion of the audiobook to a first connected portion of the audiobook, the second branch connects the current portion of the audiobook to a second connected portion of the audiobook, and wherein the first connected portion is different than the second connected portion;
present a notification that a selection may be made among the first branch and the second branch;
receive a selection of the first branch;
identify two or more flags that were each set prior to receiving the selection of the first branch, wherein a first flag of the two or more flags was set in association with a prior branch selection that was received in association with presentation of a first portion of the audiobook preceding the current portion;
in response to the selection of the first branch, select a content shell associated with the first branch;
select supplemental content based at least in part on the two or more flags;
add the supplemental content to the content shell to generate a connected portion of the audiobook associated with the first branch; and
present the connected portion of the audiobook associated with the first branch.

12. The system of claim 11, wherein the selection of the first branch is based at least in part on a user's performance of a task.

13. The system of claim 11, wherein the selection of the first branch is received from a computing device other than the computing device in communication with the electronic data store.

14. The system of claim 11, wherein the connected portion is further generated based at least in part on a path taken to the current portion of the audiobook, the path comprising at least one previously presented portion of the audiobook.

15. The system of claim 11, wherein the computing device is further configured to at least:
obtain a new portion of the audiobook; and
obtain a new branch connecting the new portion of the audiobook to the current portion of the audiobook.

16. A non-transitory computer-readable medium storing computer executable instructions that, when executed by one or more computing devices, configure the one or more computing devices to perform operations comprising:
presenting a current portion of an audiobook;
identifying a first branch and a second branch in the audiobook, wherein the first branch connects the current portion of the audiobook to a first connected portion of the audiobook, the second branch connects the current portion of the audiobook to a second connected portion of the audiobook, and wherein the first connected portion is different than the second connected portion;
presenting a notification that a selection may be made among the first branch and the second branch;
obtaining a selection of the first branch;
identifying two or more flags that were each set prior to obtaining the selection of the first branch wherein a first flag of the two or more flags was set in association with a prior branch selection that was received in association with presentation of a first portion of the audiobook preceding the current portion;
in response to the selection of the first branch, selecting a content shell associated with the first branch;
selecting supplemental content based at least in part on the two or more flags;
adding the supplemental content to the content shell to generate a connected portion of the audiobook associated with the first branch; and
presenting the connected portion of the audiobook associated with the first branch.

17. The non-transitory computer-readable medium of claim 16, wherein the selection of the branch is automatic.

18. The non-transitory computer-readable medium of claim 17, wherein the operations further comprise:
identifying a path taken to the current portion of the audiobook, the path comprising at least one previously presented portion of the audiobook; and
wherein the automatic selection of the branch is based at least in part on the path taken to the current portion of the audiobook.

19. The non-transitory computer-readable medium of claim 18, wherein the automatic selection of the branch is based at least in part on a probability determined by the path taken to the current portion of the audiobook.

20. The non-transitory computer-readable medium of claim 16, wherein the operations further comprise:
- identifying a previous portion of the audiobook, the previous portion of the audiobook being connected to the current portion of the audiobook by a branch from the previous portion of the audiobook to the current portion of the audiobook;
- determining that the previous portion of the audiobook has not been presented by the computing device; and
- in response to determining that the previous portion of the audiobook has not been presented by the computing device, causing the computing device to present the previous portion of the audiobook at least in part.

21. The non-transitory computer-readable medium of claim 20, wherein the computing device is caused to present the previous portion of the audiobook at least in part before the computing device is caused to present the current portion of the audiobook.

\* \* \* \* \*